Oct. 28, 1930.                C. SPONSEL                1,779,451
HYPODERMIC SYRINGE GUARD
Filed Feb. 1, 1929
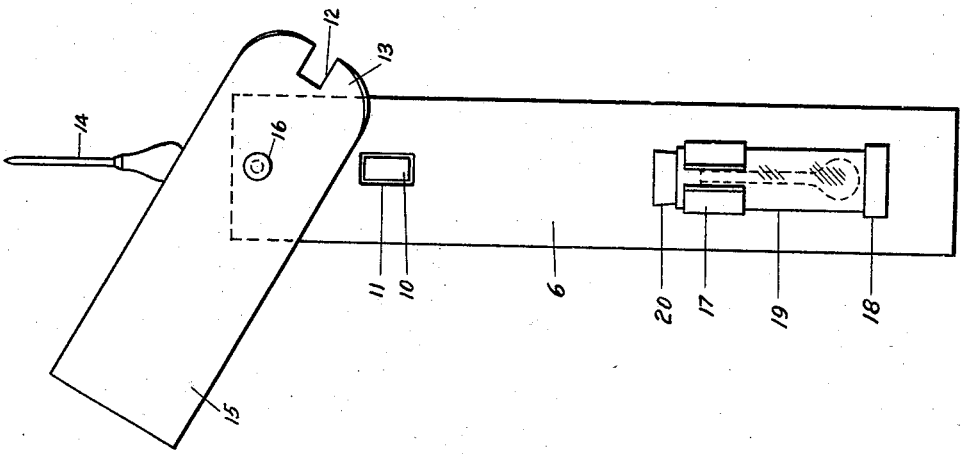
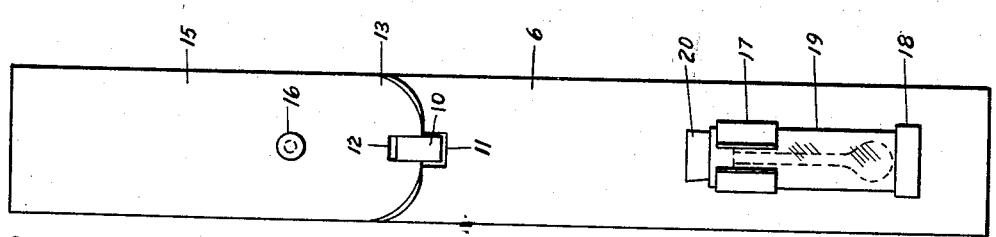
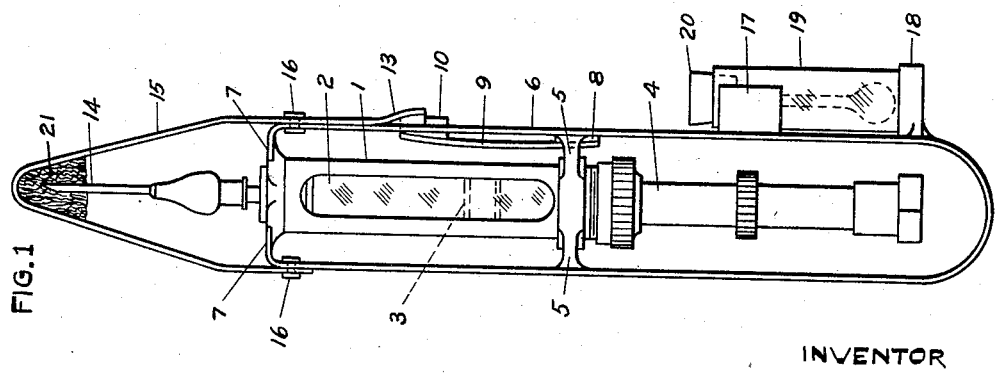
INVENTOR
CHARLES SPONSEL.
BY Toulmin & Toulmin
ATTORNEYS Patented Oct. 28, 1930

1,779,451

UNITED STATES PATENT OFFICE

CHARLES SPONSEL, OF MANCOS, COLORADO

HYPODERMIC-SYRINGE GUARD

Application filed February 1, 1929. Serial No. 336,695.

My invention relates to hypodermic syringes.

In particular it is the object of my invention to provide a hypodermic syringe with a guard for carrying the syringe so as to protect the glass container or cylinder and at the same time provide a guard which may be moved with respect to the needle so as to expose it when desired.

It is a further object of my invention to provide a needle guard which can be operated by one hand while the other is free for holding animals which are to be vaccinated.

It is an additional object of my invention to provide means of supporting a container for either disinfectant or additional serum on the side of the guard.

By my invention of having a guard over the needle as well as over the body of the syringe, I am able to provide an outfit which can be carried in the pocket without danger to the person carrying the syringe. By having the equipment complete and operable by one hand, it greatly facilitates the handling of restive animals which are being vaccinated, as for instance for blackleg. I prefer to make my syringe to carry 1mm. doses.

Referring to the drawing, Figure 1 is an end elevation of my syringe and cover.

Figure 2 is a side elevation thereof.

Figure 3 is a similar view showing the movable needle guard moved to one side.

Referring to the drawings in detail, 1 is a cylinder casing having the glass cylinder 2 of a hypodermic syringe which operates the piston 3 actuated by the piston rod 4. The rear end of the cylinder casing 1 is mounted in the arms 5 on the inside of the U-shaped protecting casing 6. The forward end of the cylinder guard 1 is connected by the arms 7 to the forward end of the casing walls 6. This casing 6 is open at the sides and constitutes a guard as well as a handle for supporting the hypodermic syringe.

Mounted upon this casing guard 6, at 8, is a spring finger 9 having a locking head 10 yieldingly projecting outwardly through the slot 11 so that it will project through the notch 12 of the swinging needle guard which has a depending flange 13 that carries the notch 12. This needle guard is a U-shaped member covering the end of the needle 14. The needle guard is designated 15 and is pivoted on the main guard 6 as at 16.

The syringe guard 6 is provided with a pair of oppositely disposed spring clips 17, and a supporting cup-shaped member 18 for supporting a glass bottle 19 that may contain a charge of disinfectant or any other desired material. This glass tube is closed by the cork 20.

It will be thus noted from my description that my invention has the following method of operation:

Method of operation

The swinging guard 15 over the needle is locked in position as shown in Figures 1 and 2. The plunger piston rod 4 is guarded by the guard 6. The whole apparatus may be placed in the pocket, which is particularly convenient when riding on the range on horseback.

When it is desired to vaccinate the animal, as for blackleg, the casing 6 may be grasped by one hand, the thumb may press down the latch member 10, while the forefinger may be used to press the needle guard 15 laterally about the pivots 16 to expose the needle as in Figure 3, whereupon the handle 6 may be employed for pressing the needle home into the animal, while the thumb can be employed for operating the piston rod plunger 4 to force the vaccine from the glass cylinder tube through the needle 14 into the animal. The disinfectant in the casing 19 is readily available for application by taking out the cork 20 which may have attached to it a swab or any other instrument. During the entire operation the other hand is free for holding the animal. 21 is a wiper for the needle.

Thus I have provided a practical self-containing casing for a hypodermic syringe which both protects its needle and protects its operating plunger, the entire apparatus being operable by one hand.

I desire to comprehend within my invention such modifications as may be clearly embraced within my claims and the scope of my invention.

Having thus fully described my invention what I claim as new and desire to secure by Letters Patent, is:

1. In combination, a hypodermic syringe, a U-shaped guard surrounding two sides of said syringe, a needle projecting beyond said guard and a needle guard pivotally mounted on the first mentioned guard to cover said needle.

2. In combination, a hypodermic syringe, a U-shaped guard surrounding two sides of said syringe, a needle projecting beyond said guard and a needle guard pivotally mounted on the first mentioned guard to cover said needle, and means to latch said guards one on the other.

3. In combination, a hypodermic syringe, a U-shaped guard surrounding two sides of said syringe, a needle projecting beyond said guard and a needle guard pivotally mounted on the first mentioned guard to cover said needle, and means to latch said guards one on the other, said latch comprising a spring member mounted on the inside of one guard projecting therethrough with a locking member inserted in a notch on the other guard.

4. In combination, a hypodermic syringe having a guard extending on two sides and across the plunger end of the syringe, a hypodermic syringe and plunger mounted therein between said side walls and end wall, a needle on said syringe projecting beyond the other end of said guard, a needle guard pivoted on said end of the syringe guard having a depending flange parallel to one wall of the syringe guard, said flange having a notch, a spring pressed finger with a locking head mounted on the inside of the syringe guard, said head projecting through an opening in the syringe guard into the notch in the needle guard.

5. In combination, a hypodermic syringe having a guard extending on two sides and across the plunger end of the syringe, a hypodermic syringe and plunger mounted therein between said side walls and end wall, a needle on said syringe projecting beyond the other end of said guard, a needle guard pivoted on said end of the syringe guard having a depending flange parallel to one wall of the syringe guard, said flange having a notch, a spring pressed finger with a locking head mounted on the inside of the syringe guard, said head projecting through an opening in the syringe guard into the notch in the needle guard, and means for carrying an extra container mounted on said syringe guard adjacent the fingers of the operator operating the syringe and the needle guard.

In testimony whereof, I affix my signature.

CHARLES SPONSEL.